United States Patent [19]

Levin

[11] Patent Number: 5,406,437
[45] Date of Patent: Apr. 11, 1995

[54] ZERO PHASE SEQUENCE CURRENT FILTER WITH ADJUSTABLE IMPEDANCE

[76] Inventor: Michael I. Levin, 33 Bayhampton Court, North York, Ontario, Canada, M3H 5L5

[21] Appl. No.: 227,408

[22] Filed: Apr. 14, 1994

[51] Int. Cl.6 ..................... H02H 7/08; H02M 7/5387
[52] U.S. Cl. ........................................ 361/76; 361/20; 361/42; 361/47; 363/39
[58] Field of Search ............... 336/5, 10, 12; 307/105; 323/205, 208, 340, 355; 363/39, 41, 71, 43, 123, 136, 138; 361/20, 42, 47, 76

[56] References Cited

U.S. PATENT DOCUMENTS

| | | |
|---|---|---|
| 1,159,228 | 11/1915 | Keidel et al. . |
| 1,537,371 | 5/1925 | Petersen . |
| 2,194,412 | 3/1940 | Trabut .................. 171/119 |
| 2,523,778 | 2/1949 | Randall .................. 175/294 |
| 3,246,267 | 4/1966 | Wesolowski et al. ........... 336/12 |
| 3,678,338 | 7/1972 | Beachley ................... 317/18 R |
| 4,037,138 | 7/1977 | Kobayashi ................. 317/13 R |
| 4,314,321 | 1/1982 | Galliker ..................... 363/10 |
| 4,694,241 | 9/1987 | Genuit ..................... 323/340 |
| 4,847,745 | 7/1989 | Shekhawat et al. ............ 363/132 |
| 4,879,509 | 11/1989 | Sometani et al. ............ 324/108 |
| 5,148,362 | 9/1992 | Braun et al. ................ 363/95 |
| 5,159,561 | 10/1992 | Watanabe et al. ............ 364/483 |

OTHER PUBLICATIONS

Hoevenaars, Levin, Ling: "A Case Study in Cutting Power System Harmonics" Electrical Systems Engineer, Spring, 1990, pp. 4,6,28–32.

Primary Examiner—Thomas M. Dougherty
Assistant Examiner—Nicholas Ponomarenko
Attorney, Agent, or Firm—Ridout & Maybee

[57] ABSTRACT

The invention provides a zero phase sequence current zig-zag filter with adjustable zero phase sequence impedance and a method for adjusting the impedance of the filter. Impedance is adjusted in discrete increments by detuning the filter one phase at a time. Detuning is accomplished using taps or auxiliary windings, whereby the ratio of the effective number of turns of the first winding relative to the second winding on the same core leg is changed independently for each phase of a three phase power supply.

16 Claims, 3 Drawing Sheets

ZERO PHASE SEQUENCE CURRENT FILTER WITH ADJUSTABLE IMPEDANCE

FIELD OF INVENTION

This invention relates to filters for electrical distribution systems. In particular, this invention relates to a zero phase sequence current filter with adjustable zero phase sequence impedance.

BACKGROUND OF THE INVENTION

Three-phase electrical distribution networks, for example distributing an electrical power supply through a building, are subject to harmonic currents generated by single-phase non-linear loads such as electronic equipment and equipment that uses different kinds of arc processes. Such equipment can generate excessive harmonic currents in the distribution network, including zero phase sequence (current) harmonics. Zero phase sequence harmonics, together with unbalanced portions of the fundamental and other harmonic currents, are additive in the neutral conductor, which can result in cumulative currents well in excess of the anticipated phase currents and overload the neutral conductor, which is not protected. In addition to the possibility of overload, these harmonics result in high common-mode noise level (neutral to ground voltage), increased total harmonic distortion level, voltage imbalance, increased power losses and other problems which are well known.

In a three-phase distribution network, zero phase sequence harmonics are conventionally controlled using zero phase sequence filters. Such filters have a low impedance to zero phase sequence harmonic currents, and as such attract these currents and effectively reduce their flow in the distribution network. The most common zero phase sequence filter is conventionally known as a "zig-zag" reactor or autotransformer.

In general, a zero phase sequence filter will be designed to offer the lowest possible impedance to zero phase sequence harmonic currents, but there are situations in which a higher impedance is needed to meet specific system requirements. Conventionally, a zig-zag filter will have to be custom designed for situations where a higher impedance is required, and in the case of an existing distribution network the existing filters must be replaced to accommodate the specified higher impedance. This is particularly troublesome in present times, where for example in commercial buildings expansion of facilities or changing tenants can give rise to new system requirements relatively frequently.

There are a number of methods currently available for adjusting the impedance of a zig-zag filter, but these are complicated and expensive, requiring sophisticated electronic equipment, and are relatively labour intensive.

The present invention overcomes these disadvantages by providing a method of adjusting the impedance of a zero phase sequence harmonic current filter and a field-adjustable zero phase sequence filter utilizing the method of the invention. The adjustment or "detuning" of the filter is easily accomplished in situ by maintenance personnel, without the need for extraneous equipment, and the zero phase sequence impedance of the filter can thus be changed as needed to accommodate changing demands on an electrical distribution network.

This is accomplished in a preferred embodiment by providing a zig-zag filter with one or more taps on one of the windings of each core leg, or an auxiliary winding connected to one of the windings on each core leg, which allow maintenance personnel to alter the effective size of the winding and thus the zero phase sequence flux produced by the winding.

In a preferred embodiment this change can be made independently for each core leg. The zero phase sequence impedance of a particular phase increases as the windings on the core leg for that phase are unbalanced or "detuned", and the increase in impedance is cumulative as between the three phases. Therefore, by providing a single tap or auxiliary winding associated with one winding for each phase, four steps of zero phase sequence impedance are made available.

The taps or auxiliary windings can be accessed as required, either by conventional switching devices or by physically unplugging the connection to the winding input terminal and reestablishing the connection through the tap or auxiliary winding input terminal.

SUMMARY OF THE INVENTION

The present invention thus provides, for use in a three-phase power supply network, a zero phase sequence current filter with adjustable zero phase sequence impedance, comprising first, second and third core legs, each having first and second windings connected in a zig-zag configuration, each first winding having an input terminal for connection to one phase of the three-phase power supply network, an end of each second winding being connected to a common terminal for connection to a neutral conductor, and means for changing a ratio of the effective number of turns of the first winding relative to the effective number of turns of the second winding on the same core leg.

The present invention further provides, in a three-phase power supply network having first, second and third phase conductors, a method of increasing in stepped increments the zero phase sequence impedance of a zero phase sequence current filter comprising three core legs each having first and second windings connected in a zig-zag configuration, comprising unbalancing the windings on a particular core leg, by changing the effective number of turns of the first winding on the core leg relative to the second winding on the same core leg, for each core leg in sequence until the desired zero phase sequence impedance is achieved.

BRIEF DESCRIPTION OF THE DRAWINGS

In drawings which illustrate by way of example only a preferred embodiment of the invention.

DETAILED DESCRIPTION OF THE INVENTION

Figure 1:
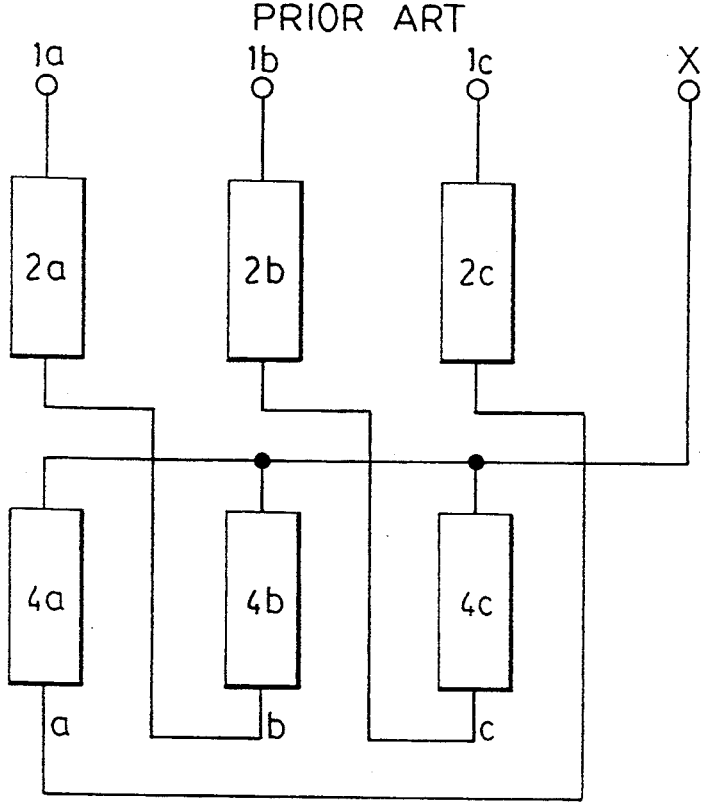
FIG. 1 is a schematic view of a conventional zig-zag filter for a three-phase electrical distribution network.

As illustrated in FIG. 1, a conventional zero phase sequence current filter for a three-phase power supply comprises first and second windings connected in a zig-zag configuration on three magnetic core legs a, b, c. The three phases of the power distribution network are connected to the input terminals 1a, 1b, 1c of the first windings 2a, 2b, 2c of each core leg a, b, c, respectively. The other end of first winding 2a is connected to one end of second winding 4b; the other end of first winding 2b is connected to one end of second winding 4c; and the other end of first winding 2c is connected to one end of the second winding 4a. The other ends of all second windings are connected to a common terminal X for the neutral conductor. The filter is connected to the three-phase power supply system in parallel to the distribution network.

Connected in this fashion, the zero phase sequence fluxes generated by the first and second windings on any particular core leg a, b, c are equal and oppositely directed, thus cancelling each other out. The better the cancellation, the lower the zero phase sequence impedance of the filter; by connecting the filter to the power supply system in parallel to the load, zero phase sequence currents are attracted to the filter (because of its low impedance) and thus reduced in the distribution network.

As the requirements of the distribution network change, for example with an increase in the loading on the network, a change in the type of loading on the network or to avoid attracting too much current to the filter, it may become necessary or desirable to increase the impedance of the filter. This is accomplished in the present invention by equipping each of the first or second windings with a tap or an auxiliary winding, thereby enabling a change in the effective size (number of turns) of the first winding relative to the second winding. In a preferred embodiment this change can be effected independently for each phase, and can thus be effected in controlled increments.

Figure 2:
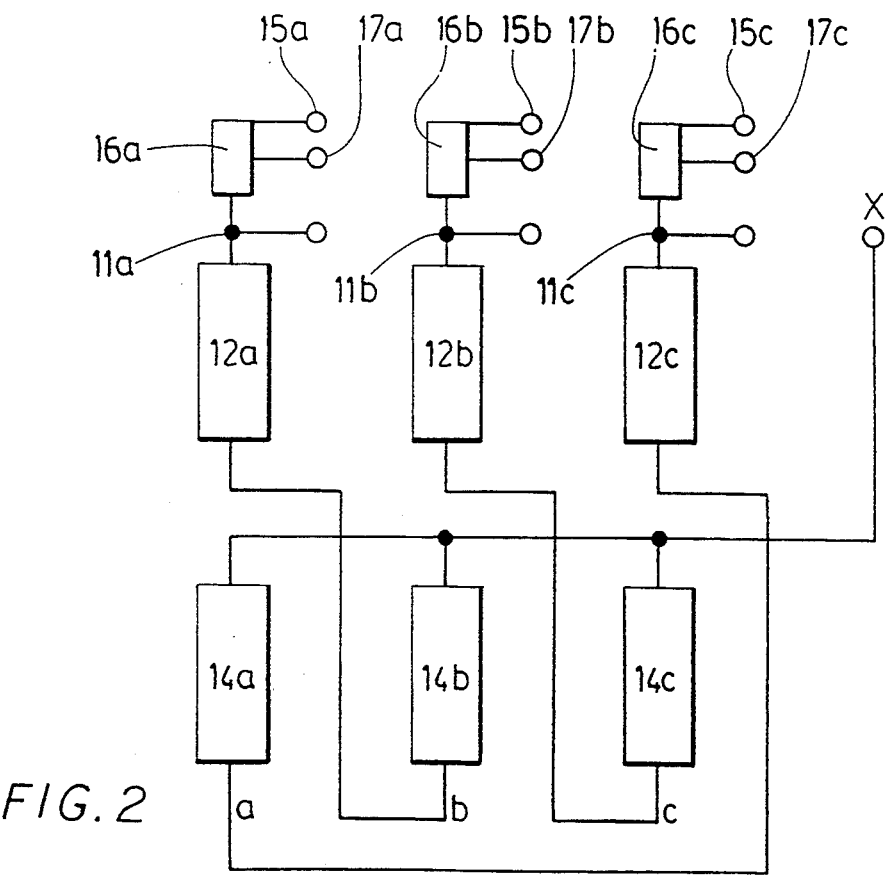
FIG. 2 is a schematic view of a zig-zag filter embodying the invention with auxiliary windings connected to the inputs of the first windings.

FIG. 2 illustrates a zig-zag filter according to the invention. Each of the three core legs a, b, c are provided with first and second windings 12a, 14a, 12b, 14b and 12c, 14c, respectively, of the same size (number of turns) and connected in a zig-zag configuration as described above with respect to the conventional filter illustrated in FIG. 1. In the embodiment of FIG. 2 the first windings are extended, ie. provided with additional turns, through auxiliary windings 16a, 16b, 16c connected to the input terminals 11a, 11b, 11c of the first windings 12a, 12b, 12c. Whether the auxiliary windings 16a, 16b, 16c are constructed as physically separate windings or merely as additional turns on the first windings 12a, 12b, 12c is irrelevant, so long as each auxiliary winding 16a, 16b, 16c is on the same core leg a, b, c as its associated first winding 12a, 12b, 12c.

In the embodiment illustrated in FIG. 2 the auxiliary windings 16a, 16b, 16c are each provided with both input terminals 15a, 15b, 15c and taps 17a, 17b, 17c, respectively. However, it will be appreciated that in the preferred embodiment of the method of the invention, whereby the impedance of the filter is increased by "phase-stepped detuning" as described below, in most situations the taps 17a, 17b, 17c will be unnecessary.

In operation, the lowest zero phase sequence impedance is obtained with the three phase conductors coupled to the first winding inputs 11a, 11b, 11c. If it is desired to raise the impedance of the filter, this can be effected in steps by "detuning" each phase independently of the other phases, i.e. disconnecting one of the mains phase conductors from its associated terminal 11a, 11b or 11c, and reconnecting the conductor to the auxiliary winding input 15a, 15b or 15c (or tap 17a, 17b or 17c) of the same core leg a, b, c. This will increase the overall impedance of the filter by a specific discrete increment. Two further incremental increases can be obtained, if desired, by detuning the second and third phases in this fashion. Detuning of a single phase will result in a small increase in the impedance of the filter, and this increase is cumulative as each phase is detuned so that the impedance of the filter is highest when all three phase conductors have been detached from the input terminals 11a, 11b, 11c of the first windings 12a, 12b, 12c and reconnected to the input terminals 15a, 15b, 15c of the auxiliary coils 16a, 16b, 16c. Thus, four discrete levels of impedance are available through this method of "phase-stepped detuning": 1. All phases balanced; 2. One phase detuned; 3. Two phases detuned; or 4. All phases detuned.

(In practise, the increase in impedance which occurs when the centre phase is detuned is slightly less than the increase obtained by detuning either of the two outer phases. Accordingly, there are technically five levels of impedance available according to the method of the invention, although the difference in impedance between two of these levels is slight and for practical purposes can be ignored.)

The level of increase in the impedance of the filter can be designed to be different for each phase, by providing auxiliary coils 16a, 16b, 16c of different sizes (number of turns) for each of the three phases. Three discrete impedance levels would be available depending upon which phase is detuned, and three different levels of impedance would result from detuning combinations of two phases at a time. Adding the two levels of impedance obtained by detuning none or all of the phases brings the total available impedance levels to eight. Adding additional taps or auxiliary windings would increase the number of impedance levels exponentially, but in practise this will generally be unnecessary.

Figure 3:
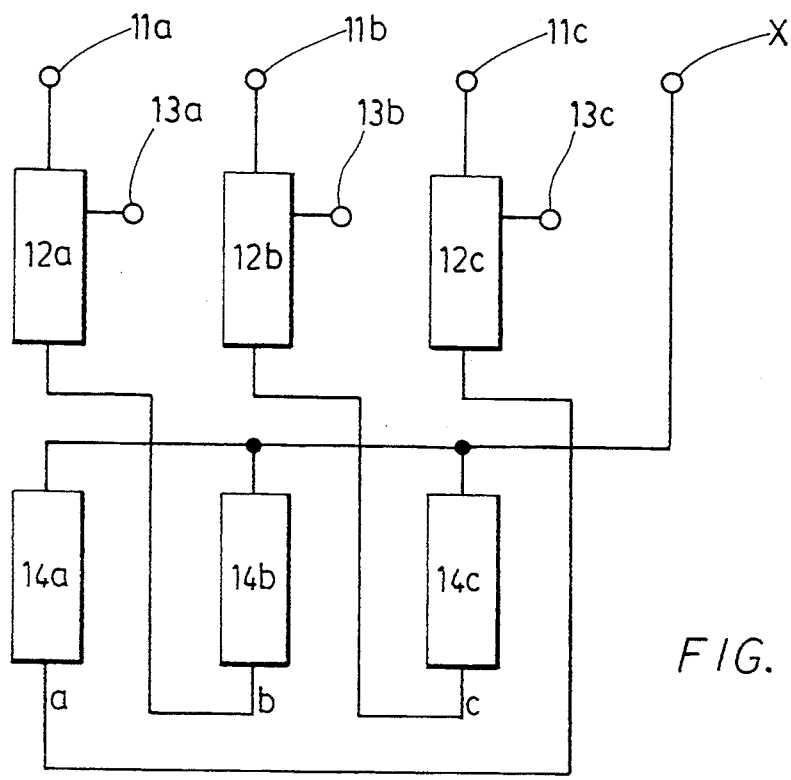
FIG. 3 is a schematic view of a further embodiment of the invention with taps connected to the first windings.

FIG. 3 illustrates an alternate embodiment of the invention, in which a tap 13a, 13b, 13c is provided for each of the first windings 12a, 12b, 12c, respectively. The phase-stepped detuning method operates in exactly the same fashion as described above, the only difference being that in this embodiment the effective size of the first winding 12a, 12b or 12c is reduced (as opposed to the embodiment of FIG. 2, in which the effective size of the first winding is increased through the additional turns provided by the auxiliary winding). In either case the result is an unbalancing of the respective zero phase sequence fluxes generated in the first and second windings of a particular core leg, with diminished cancellation resulting in detuning of the corresponding phase.

Figure 4:
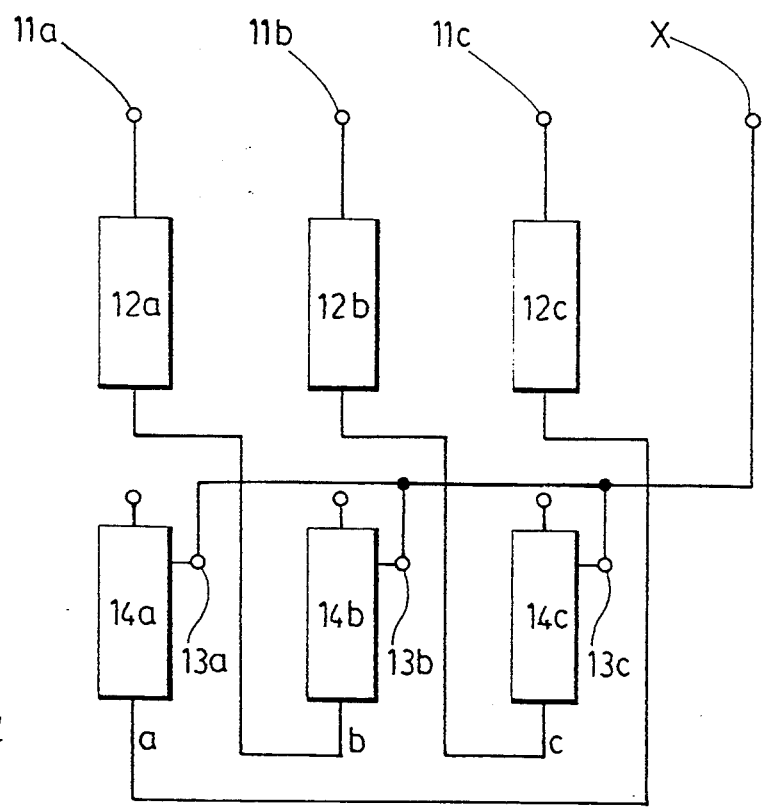
FIG. 4 is a schematic view of a further embodiment the invention with auxiliary windings connected to the outputs of the second windings.
Figure 5:
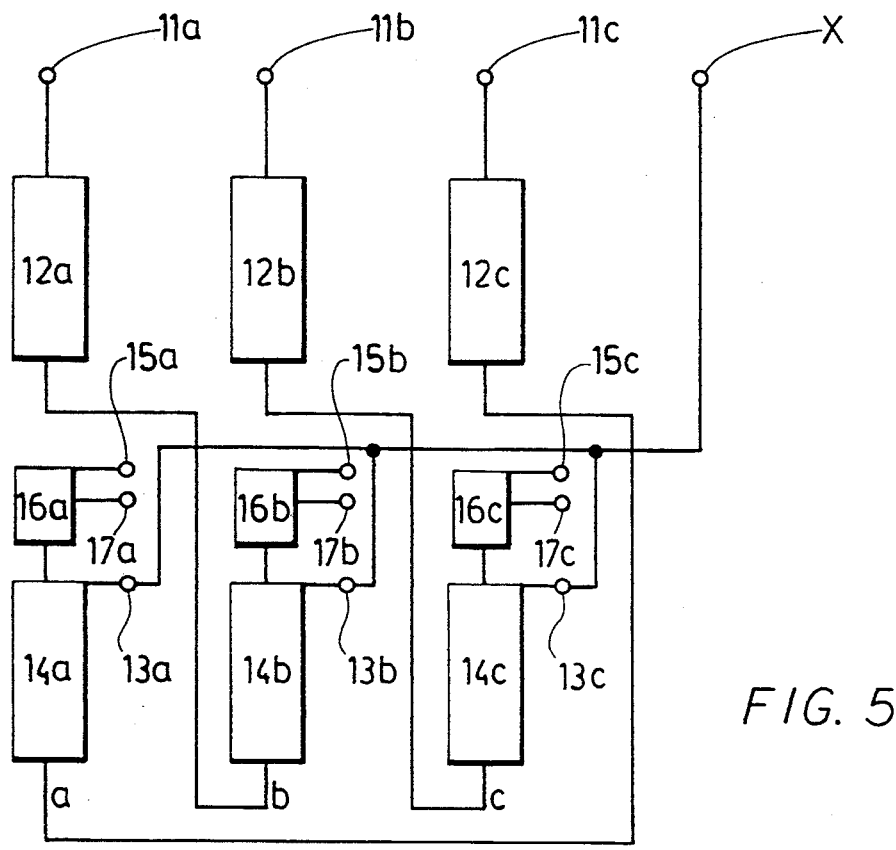
FIG. 5 is a schematic view of a further embodiment of the invention with taps connected to the second windings.

The same result can be achieved by tapping the second windings 14a, 14b, 14c, thereby increasing the effective number of turns of the first winding relative to the secondary winding (see FIG. 4). Alternatively, an auxiliary winding 16a, 16b, 16c can be connected to either end of each second winding, so that when the neutral conductor is connected to the auxiliary winding output terminal 15a, 15b, 15c (or tap 17a, 17b, 17c) instead of the second winding output terminal 13a, 13b, 13c, the effective number of turns of the first winding relative to the second winding is decreased (see FIG. 5).

Figure 6:
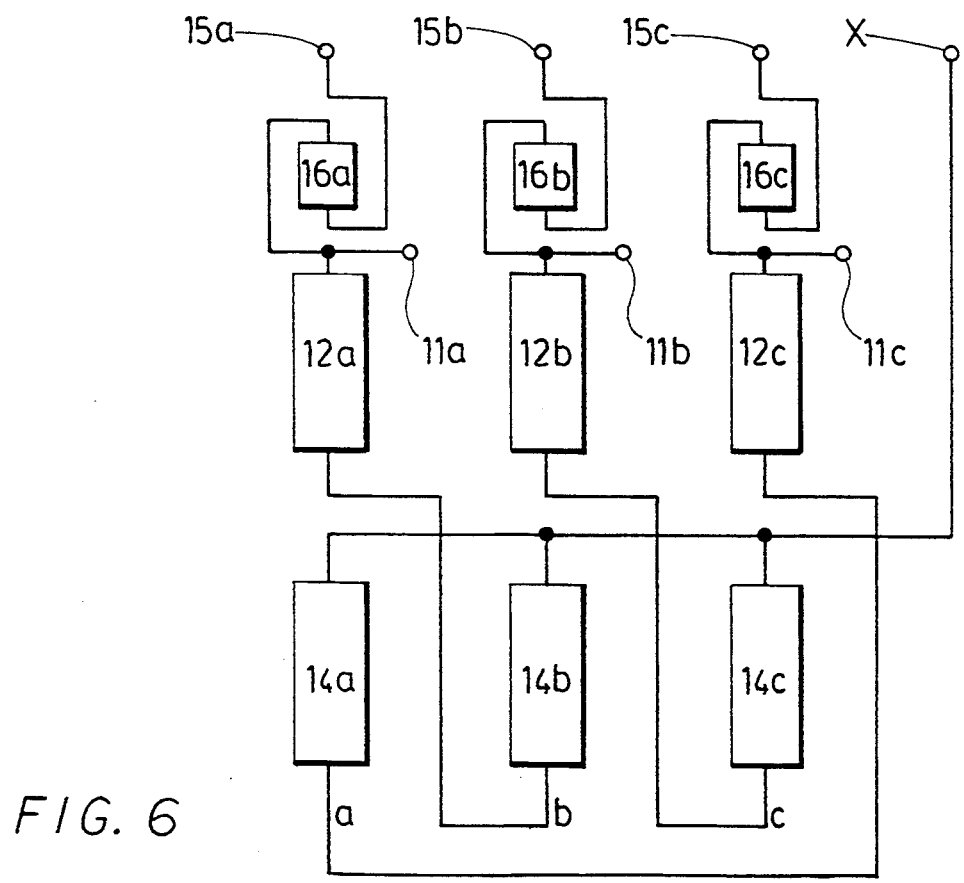
FIG. 6 is a schematic view of a still further embodiment of the invention in which the polarity of the auxiliary winding is reversed relative to the polarity of the first winding.

The same result can also be achieved by configuring the auxiliary windings 16a, 16b, 16c so that their polarity is reversed relative to the windings to which they are connected. For example, as shown in FIG. 6, auxiliary windings 16a, 16b, 16c are connected to first windings 12a, 12b, 12c respectively, but the polarity of the auxiliary windings 16a, 16b, 16c is reversed relative to that of the first windings 12a, 12b, 12c. Thus, by removing the phase conductor from the first winding input 11a, 11b or 11c, and reconnecting it to the input 15a, 15b, or 15c of the corresponding auxiliary winding 16a, 16b or 16c, respectively, the windings on the relevant core leg become unbalanced and the phase is thus detuned, with the same effect as in the previous embodiments.

It will thus be appreciated that the detuning of a phase results from unbalancing the first and second windings on the core leg corresponding to that phase. It is irrelevant whether the effective number of turns changes in the first winding or in the second winding, or whether this change results in an increase in the effective number of turns or a decrease. The net result, and the amount of impedance increase, is entirely dependant upon the extent of unbalancing, i.e. for each secondary winding the change in the ratio of the effective number of turns of the first winding relative to the effective number of turns of the second winding on the same core leg a, b or c.

The invention having thus been described by way of example with reference to a preferred embodiment, it will be obvious to those skilled in the art that certain modifications and adaptations may be made without departing from the scope of the invention, as set out in the appended claims.

I claim:

1. For use in a three-phase power supply network, a zero phase sequence current filter with adjustable zero phase sequence impedance, comprising
   first, second and third core legs, each having first and second windings connected in a zig-zag configuration,
   each first winding having an input terminal for connection to one phase of the three-phase power supply network,
   an end of each second winding being connected to a common terminal for connection to a neutral conductor, and
   means for changing a ratio of the effective number of turns of the first winding relative to the effective number of turns of the second winding on the same core leg to thereby reduce the degree of cancellation of zero phase sequence fluxes on the core leg by unbalancing the zero phase sequence fluxes generated in the first and second windings of the same core leg,
   whereby zero phase sequence flux compensation in the core is reduced and the zero phase sequence impedance is increased without any change in the voltage of the power supply network.

2. The filter of claim 1 in which means for changing the effective number of turns comprises a tap connected to each first winding.

3. The filter of claim 1 in which means for changing the effective number of turns comprises a tap connected to each second winding.

4. The filter of claim 1 in which means for changing the effective number of turns comprises an auxiliary winding having a terminal for connection to one phase conductor of the three-phase power supply and an end connected to the input terminal of the first winding.

5. The filter of claim 2 in which each tap is respectively connected to each first winding at a different position, whereby the change in the effective number of turns effected by connecting a phase conductor to the tap is different for the first windings of each core leg.

6. The filter of claim 3 in which each tap is respectively connected to each second winding at a different position, whereby the change in the effective number of turns effected by connecting the neutral conductor to the tap is different for the second winding of each core leg.

7. The filter of claim 4 in which the auxiliary winding for each core leg has a different number of turns than the auxiliary windings for the other core legs.

8. The filter of claim 4 in which the polarity of the auxiliary winding for each core leg is reversed relative to the polarity of the winding to which the auxiliary winding is connected.

9. The filter of claim 1 in which the means for changing a ratio of the effective number of turns of the first winding relative to the effective number of turns of the second winding on the same core leg operates for each core leg independently of the windings on the other core legs.

10. In a three-phase power supply network having first, second and third phase conductors, a method of increasing in stepped increments the zero phase sequence impedance of a zero phase sequence current filter to any desired zero phase sequence impedance, comprising three core legs each having first and second windings connected in a zig-zag configuration, comprising unbalancing the windings on a particular core leg, by changing the effective number of turns of the first winding on the core leg relative to the second-winding on the same core leg, for each core leg in sequence until the desired zero phase sequence impedance is achieved.

11. The method of claim 10 in which the effective number of turns of the first winding is increased relative to the effective number of turns of the second winding on the same core leg.

12. The method of claim 11 in which the effective number of turns is increased by tapping the second winding.

13. The method of claim 11 in which the effective number of turns is increased by connecting an auxiliary winding to an input terminal of the first winding.

14. The method of claim 10 in which the effective number of turns of the first winding is decreased relative to the effective number of turns of the second winding on the same core leg.

15. The method of claim 14 in which the effective number of turns is decreased by tapping the first winding.

16. The method of claim 14 in which the effective number of turns is decreased by connecting an auxiliary winding to an end of the second winding.

* * * * *